United States Patent
Harazono (10) Patent No.: US 12,442,007 B2
(45) Date of Patent: Oct. 14, 2025

(54) METHOD FOR PRODUCING TARGET PROTEIN

(71) Applicant: Nagase Viita Co., Ltd., Okayama (JP)

(72) Inventor: Koichi Harazono, Kyoto (JP)

(73) Assignee: Nagase Viita Co., Ltd., Okayama (JP)

( * ) Notice: Subject to any disclaimer, the term of this patent is extended or adjusted under 35 U.S.C. 154(b) by 455 days.

(21) Appl. No.: 18/000,216

(22) PCT Filed: May 20, 2021

(86) PCT No.: PCT/JP2021/019197
§ 371 (c)(1),
(2) Date: Nov. 29, 2022

(87) PCT Pub. No.: WO2021/251098
PCT Pub. Date: Dec. 16, 2021

(65) Prior Publication Data
US 2023/0203511 A1   Jun. 29, 2023

(30) Foreign Application Priority Data

Jun. 12, 2020 (JP) ................................ 2020-102499

(51) Int. Cl.
C12N 9/16 (2006.01)
C12N 9/24 (2006.01)
C12N 15/76 (2006.01)

(52) U.S. Cl.
CPC .............. *C12N 15/76* (2013.01); *C12N 9/16* (2013.01); *C12N 9/2405* (2013.01); *C12Y 301/04004* (2013.01)

(58) Field of Classification Search
CPC ............. C12N 15/52; C12N 9/16; C12N 9/00
See application file for complete search history.

(56) References Cited

U.S. PATENT DOCUMENTS

| 2009/0263861 A1 | 10/2009 | Grabherr et al. | |
| 2014/0106398 A1 | 4/2014 | Bovenberg et al. | |
| 2023/0203511 A1* | 6/2023 | Harazono | C12N 15/52 435/199 |

FOREIGN PATENT DOCUMENTS

| JP | 2008-505620 | 2/2008 |
| JP | 2012-165686 | 9/2012 |
| JP | 2013-533743 | 8/2013 |
| JP | 2014-207898 | 11/2014 |
| JP | 2017-500042 | 1/2017 |
| WO | 2006/003412 | 1/2006 |
| WO | 2012/001352 | 1/2012 |
| WO | 2015/091280 | 6/2015 |

OTHER PUBLICATIONS

Janosi, et al., "Ribosome recycling factor (ribosome releasing factor) is essential for bacterial growth", Proc. Natl. Acad. Sci USA, 91, May 1994, 4249-4253.
Zhang, et al., "An Efficient Procedure for Marker-Free Mutagenesis of S. coelicolor by Site-Specific Recombination for Secondary Metabolite Overproduction", PLoS One 8(2): e55906, Feb. 7, 2013.
Yu et al., "A Site-Specific Recombinase-Based Method to Produce Antibiotic Selectable Marker Free Transgenic Cattle", PLoS One 8(5): e62457, May 1, 2013.
Sevillano, et al., "Development of an antibiotic marker-free platform for heterologous protein production in Streptomyces", Microbial Cell Factories, 16:164, 2017, 13 pages.
Oliveira, et al., "Marker-free plasmids for biotechnological applications—implications and perspectives", Trends in Biotechnology, Sep. 2013, vol. 31, No. 9, pp. 539-547.
Tseng, et al. "The melanin operon of Streptomyces antibioticus: expression and use as a marker in Gram-negative bacteria", Gene, vol. 86, Issue 1, Jan. 31, 1990, pp. 123-128.

* cited by examiner

*Primary Examiner* — Tekchand Saidha
(74) *Attorney, Agent, or Firm* — HSML P.C.

(57) ABSTRACT

Provided is a method which can produce a target protein while stably maintaining a vector without any special genetic manipulation of host cells and without use of a drug resistance gene or the like. A method for producing a target protein including culturing cells transformed with a vector, the vector containing a gene of the target protein and not containing an antibiotic resistance gene, a recombinase recognition sequence, or a gene essential for cell survival.

5 Claims, 4 Drawing Sheets
Specification includes a Sequence Listing.

FIG.1

Detection of expressed protein

With drug    Without drug

SEQUENCE LISTING

```
<160> NUMBER OF SEQ ID NOS: 15

<210> SEQ ID NO 1
<211> LENGTH: 1623
<212> TYPE: DNA
<213> ORGANISM: Unknown
<220> FEATURE:
<223> OTHER INFORMATION: phospholipase

<400> SEQUENCE: 1
atgctccgcc accggctccg ccgtttacac cgtctgaccc gcagtgcggc ggtctcggcc      60
gtcgtcctgg ccgccctgcc cgcggctccg gccttcgcga gcagccctc gcccgccccg     120 cacctggacg ccgtggagaa ggcgctgcgc gaggtctcac cggggctgga gggtgacgtc     180
tggcagcgca ccgacggcaa caagctggac gcctccgccg cggacccctc cgactggctg     240
ctgcagaccc ccggttgctg gggcgacgcc gcgtgcaagg agcgtcccgg caccgagcgc     300
ctgctcgcca aggtgacgga gaacatctcc aaggccaggc gcacggtgga catctccacg     360
ctcgcgccct tcccgaacgg tgcgttccag gacgcgatag ccgccggcct caaggcgtcg     420
gtcgcgtccg gcaacaagcc gaaggtccgc gtcctggtcg gcgccgcgcc ggtctaccac     480
atgaacgtac tgccctcgaa gtaccgggac gacctcaagg cccggctcgg caaggccgcc     540
gacgacatca cgctgaacgt cgcgtcgatg acgacgtcga agaccagctt ctcctggaac     600
cactccaagc tcctcgtcgt ggacggcgag tcggccgtca ccggtggcat caacagctgg     660
aaggacgact acgtcgacac ccagcacccg gtgaccgacg tggacctggc gctgaccggc     720
cccgccgcga gctccgccgg ccgctacctg gacacgctct ggacgtggac gtgccagaac     780
```

```
aagagcaaca tcgccagtgt gtggttcgcg gcctcgggcg gcgactgcat ggccacgatg      840
gagaaggacg cgaaccccag gcccgccggg cccacgggca acgtccccgt gatcgccgtg      900
ggcggcctcg gcgtcggcat caaggactcc gaccccgcct ggacgttccg cccgcagctg      960
ccctccgccc cggacaccaa gtgcgtcgtc ggcctgcccg acaagaccaa cgccgaccgt     1020
gactacgaca cggtcaaccc cgaggagagc gccctgcggg ccctggtggc cagcgccgac     1080
cgccagatcg tcatctccca gcaggacctg aacgccacct gcccgcccat cgcccgctac     1140
gacgtccgcc tctacgacat cctcgccgcc aagatggcgg ccggggtgaa ggtgcgcatc     1200
gtcgtcagcg accccgccaa ccgcggcgcg gtcggcagcg gcggctactc gcaaatcaag     1260
tccctggccg agatcagcga cacgctccgc aaccgtctcg ccctgctcaa gggcggcgac     1320
cagcagaagg ccaaggcggc catgtgctcc accctccagc tggggacctt ccgcagctcc     1380
gcgagcgcca cgtgggccga cgggcacccc tacgccctgc accacaagct ggtggcggtc     1440
gacagctccg ccttcaacat cggctccaag aacctctacc cctcgtggct gcaggacttc     1500
ggctacatcg tggagagccc ggaggccgcc aagcagcttg aggccaagct cctcgacccc     1560
gagtggaagt tctcgcagga gaccgcgacg gtcgaccacg cgcggggcgt ctgctcgctc     1620
tga                                                                   1623

<210> SEQ ID NO 2
<211> LENGTH: 1197
<212> TYPE: DNA
<213> ORGANISM: Unknown
<220> FEATURE:
<223> OTHER INFORMATION: glucanase

<400> SEQUENCE: 2
atgctctccc gactcagaca ccgtctgctc gccgtggccg cggccgcagg cctgaccggc       60
gccctgctct cgttcggcgc cgcaccgccc gcggacgccg cggtgcccgc caccatcccc      120
ctgaagatca ccaacaactc cgctcgtggc gacgccgtcc acatctacaa cctgggcacc      180
tcgctgacga ccggtcagca gggctgggcg gacgagaacg gaaccttcca cgcctggccc      240
gccggcggca atccccccac tcccgcaccg gacgcgtcca tccctggacc ggccgcggga      300
cagaccaaga ccatccggat cccgaagctg tcgggacgca tctacttctc ctacggccag      360
aagctggact tccggctcac caccggcggc ctggtccagc ccgccgtgca gaaccccagc      420
gaccccaacc gcaacatcct cttcaactgg tccgagtaca cgctcaacga cggcgggctg      480
tggctgaaca gcacccaggt cgacatgttc tccgcgccct acacggtcgg cgtgcagcgc      540
gccgacggcg gcgtgaccag cgccggacag ctcaaggccg gtggctaccg cggggtgttc      600
gacgcgctgc gggcccagcc gggctggggc ggctgatcc agaccccgcc cgacggcacc      660
gtactgcggg cgctggcgcc gctgtacggg gtggagaccg gggcgctgcc cgcgtcggtc      720
atggacgact acatcaaccg ggtctggcag aagtacacga cgaccacgct caccgtcacg      780
cccttcggcg accgtccgga caccaagtac ttcggacgcg tctcgggcaa cgtcatgaac      840
ttcaccaaca cctccggcgc ggtcgtcacc agcttccaga agccggacgc ctccagcgtc      900
ttcggctgcc accggctcct ggacgcgccc aacgaccagg tgcgcgggcc gatctcgcgc      960
acgctgtgcg ccggcttcaa ccgctcgacg ctgctgagca ccccaaccca gcccgatccc     1020
tcggcggcga acttctaccg ggacccggtg accaaccact acgcccggat catccacgag     1080
cgcatggccc acgggaaggc gtacgcgttc gccttcgacg acgtcggcaa ccacgagtcg     1140
ctggtgcacg acggcaaccc ggccgaggcg aggctcacgc tcgccccgct cgactga        1197
```

<210> SEQ ID NO 3
<211> LENGTH: 298
<212> TYPE: DNA
<213> ORGANISM: Unknown
<220> FEATURE:
<223> OTHER INFORMATION: metalloendopeptidase promoter

<400> SEQUENCE: 3
caggactgct caggtgcgtt ttcgtatgcc cgaacgcgcc cggacgactc cccgaacccg    60
tccggtattt gagacgcgcc cacagggcgc cggggtgcca cgaaacaaac ccccgtccca   120
gttcaccgca tagcggaacc aaacaaccgc actccgaga acgggagatc aaatccttgt    180
tgcgcccctg tcaatgacgc ccaaacaatg gcactctctc ctcaattcgc tcctgcacca   240
cacctgcacc acagggcggt cgtacaaccg gctgctccaa cccccctcat aggagaca    298

<210> SEQ ID NO 4
<211> LENGTH: 72
<212> TYPE: DNA
<213> ORGANISM: Unknown
<220> FEATURE:
<223> OTHER INFORMATION: phospholipase promoter

<400> SEQUENCE: 4
ggctcccggg agctgatagc ttctccgcgt tgatcttccg ttcgcggaat cgttacttcg    60
tttaaggatg ca                                                       72

<210> SEQ ID NO 5
<211> LENGTH: 206
<212> TYPE: DNA
<213> ORGANISM: Unknown
<220> FEATURE:
<223> OTHER INFORMATION: phospholipase terminator

<400> SEQUENCE: 5
gcatgcgacg actgagcgcc cggacgttcc ggggcgcatg acgggggaat gcccgtaccg    60
ctgaggtacg ggcattcccc cgttcgctca tataactacg ttcgaatatc ggggaatgat   120
ccgatcgtct tcactccata gtgaacggat ttcattccgt gtcgctccgg atgcaaccat   180
gcgctggccc cgaaccgacc ggaaat                                        206

<210> SEQ ID NO 6
<211> LENGTH: 30
<212> TYPE: DNA
<213> ORGANISM: Artificial sequence
<220> FEATURE:
<223> OTHER INFORMATION: sense primer

<400> SEQUENCE: 6
ctctcgccgt cggcgtgcag ttgcttcctc                                    30

<210> SEQ ID NO 7
<211> LENGTH: 30
<212> TYPE: DNA
<213> ORGANISM: Artificial Sequence
<220> FEATURE:
<223> OTHER INFORMATION: antisense primer

<400> SEQUENCE: 7
catggacgcc ctccagggca cccggaagag                                    30

<210> SEQ ID NO 8

```
<211> LENGTH: 30
<212> TYPE: DNA
<213> ORGANISM: Artificial Sequence
<220> FEATURE:
<223> OTHER INFORMATION: sense primer

<400> SEQUENCE: 8
ggaattccag gactgctcag gtgcgttttc                                          30

<210> SEQ ID NO 9
<211> LENGTH: 30
<212> TYPE: DNA
<213> ORGANISM: Artificial Sequence
<220> FEATURE:
<223> OTHER INFORMATION: antisense primer

<400> SEQUENCE: 9
ggaattctcc tggggtgtga caccctacgc                                          30

<210> SEQ ID NO 10
<211> LENGTH: 34
<212> TYPE: DNA
<213> ORGANISM: Artificial Sequence
<220> FEATURE:
<223> OTHER INFORMATION: sense primer

<400> SEQUENCE: 10
ggtggggata tcggtcgtcc taccggctgc tgtg                                     34

<210> SEQ ID NO 11
<211> LENGTH: 36
<212> TYPE: DNA
<213> ORGANISM: Artificial Sequence
<220> FEATURE:
<223> OTHER INFORMATION: antisense primer

<400> SEQUENCE: 11
ggtggggata tcgatcaccc ccgacagcgg atcaag                                   36

<210> SEQ ID NO 12
<211> LENGTH: 31
<212> TYPE: DNA
<213> ORGANISM: Artificial Sequence
<220> FEATURE:
<223> OTHER INFORMATION: sense primer

<400> SEQUENCE: 12
ggttcggcga tatcagctca ctcaaaggcg g                                        31

<210> SEQ ID NO 13
<211> LENGTH: 43
<212> TYPE: DNA
<213> ORGANISM: Artificial Sequence
<220> FEATURE:
<223> OTHER INFORMATION: antisense primer

<400> SEQUENCE: 13
ggaattcccg gctcgcgata tcccgatttc ggcctattgg tta                           43

<210> SEQ ID NO 14
<211> LENGTH: 30
<212> TYPE: DNA
<213> ORGANISM: Artificial Sequence
<220> FEATURE:
<223> OTHER INFORMATION: sense primer

<400> SEQUENCE: 14
```

```
ccatcgatcc cccgacagcg gatcaagggg                                              30
```

<210> SEQ ID NO 15
<211> LENGTH: 30
<212> TYPE: DNA
<213> ORGANISM: Artificial Sequence
<220> FEATURE:
<223> OTHER INFORMATION: antisense primer

<400> SEQUENCE: 15

```
ggcggtacct cgcgcccgac tcgcctcgct                                              30
```

METHOD FOR PRODUCING TARGET PROTEIN

TECHNICAL FIELD

The present invention relates to a method for producing a target protein.

BACKGROUND ART

Various enzymes have been used to improve the shelf life, taste, texture, and other properties of food. Enzymes are proteins that originally exist in natural organisms such as microorganisms and plants or outside the cells thereof. Enzymes are industrially produced by microbial culture, cell culture, plant cultivation, or other techniques and then purified before use. Moreover, in order to improve the productivity of enzymes, they may be expressed in large quantities by genetic recombination.

In nature, organisms having plasmid DNA in addition to chromosomal DNA are known. Techniques of improving plasmid DNA as a vector for artificial expression of a target protein to impart a new function to host cells are generally known. Such expression of a protein by genetic recombination is carried out by introducing a vector containing the gene of the protein into host cells and culturing the host cells. Here, since the vector is merely an unnecessary foreign factor for the host cells, the vector problematically tends to easily fall off while the culture is continued. In order to avoid this problem, various methods for stably maintaining the vector in the host cells have been developed.

The most widely used method for stably maintaining the vector is to introduce an antibiotic resistance gene in addition to the gene of the protein into the vector and culture the host cells in the presence of an antibiotic. Since the host cells cannot live without an antibiotic resistance gene, the vector containing the antibiotic resistance gene is also stably maintained. However, there is a risk that the antibiotic resistance gene may contaminate the resulting enzyme product. There is also a concern that the leakage of the antibiotic resistance gene or the antibiotic itself into the environment may lead to the development of resistant bacteria.

To handle these issues, there has been proposed a method of selectively cutting and removing the antibiotic resistance gene out of the vector once the growth of the host cells reaches a certain level or higher (Patent Literatures 1 and 2). Other known methods include a method of knocking out an essential gene originally possessed by the host cells and introducing the gene into the vector (Patent Literature 3), a method of introducing a recombinase recognition sequence into the vector (Non-Patent Literatures 1 and 2), and a method of maintaining a gene that expresses a substance toxic to the host cells in the host genome and introducing the corresponding detoxification gene into the vector (Non-Patent Literature 3).

CITATION LIST

Patent Literature

Patent Literature 1: JP 2008-505620 T
Patent Literature 2: JP 2013-533743 T
Patent Literature 3: JP 2017-500042 T

Non-patent Literature

Non-Patent Literature 1: Bo Zhang et al. PLoS ONE 8(2): e55906 (2013) Non-Patent Literature 2: Yuan Yu et al. PLoS ONE 8(5): e62457 (2013) Non-Patent Literature 3: Sevillano et al. Microb Cell Fact (2017) 16: 164

SUMMARY OF INVENTION

Technical Problem

In the method of Patent Literatures 1 and 2, the amount of antibiotic used can be reduced, but the risk of contamination of the resulting enzyme product with the antibiotic resistance gene cannot be eliminated. In the method of Patent Literature 3, it is necessary to knock out the essential gene of the host cells. In the methods of Non-Patent Literatures 1 to 3, it is necessary to introduce a specific sequence other than that of the target protein into the vector. An object of the present invention is to provide a method which can produce a target protein while stably maintaining a vector without any special genetic manipulation of host cells and without use of a drug resistance gene or the like.

Solution to Problem

The present inventor made extensive studies to find that a vector can be stably maintained without any special genetic manipulation of host cells and without use of a drug resistance gene. This finding has led to the completion of the present invention.

Specifically, the present invention relates to a method for producing a target protein, including culturing cells transformed with a vector, the vector containing a gene of the target protein and not containing an antibiotic resistance gene, a recombinase recognition sequence, or a gene essential for cell survival.

The gene essential for cell survival is preferably a gene encoding a ribosome recycling factor or a gene encoding a translation initiation factor.

The cells are preferably cells of a bacterium.

The bacterium is preferably an actinomycete.

The target protein is preferably an enzyme.

The enzyme is preferably phospholipase, glucanase, protease, α-amylase, β-amylase, maltogenic amylase, glucan 1,4-α-maltotriohydrolase, glucan 1,4-α-maltohexaosidase, cellulase, hemicellulase, galactolipase, glucose oxidase, ascorbate oxidase, peroxidase, lipoxygenase, catalase, glutathione dehydrogenase, peptidase, transglutaminase, cyclodextrin glucanotransferase, triacylglycerol lipase, phosphodiesterase, esterase, muramidase, phosphatase, glutaminase, chitosanase, or chitinase.

Advantageous Effects of Invention

In the production method of the present invention, a vector can be stably maintained without particular genetic manipulation of host cells and without use of a drug resistance gene. The risk of contamination of the resulting enzyme product with the antibiotic resistance gene and the risk of leakage of the antibiotic resistance gene into the environment can be eliminated.

DESCRIPTION OF EMBODIMENTS

<Method for Producing Target Protein>

The method for producing a target protein of the present invention is characterized by including culturing cells transformed with a vector which contains a gene of the target protein and does not contain an antibiotic resistance gene, a recombinase recognition sequence, or a gene essential for cell survival.

In the step of culturing cells, cells transformed with a vector, which will be described later, are cultured. The medium for culture may be any natural or synthetic medium which contains a carbon source, nitrogen source, inorganic salt, and other components that the cells can assimilate and which can efficiently culture the cells. Examples of the carbon source include: carbohydrates such as glucose, galactose, fructose, xylose, sucrose, raffinose, and starch; organic acids such as acetic acid and propionic acid; and alcohols such as ethanol and propanol. Examples of the nitrogen source include ammonia, ammonium salts of inorganic or organic acids such as ammonium chloride, ammonium sulfate, ammonium acetate, and ammonium phosphate, and other nitrogen-containing compounds. Other examples include peptones, meat extracts, fish extracts, corn steep liquor, yeast extracts, and various amino acids. Examples of the inorganic material include potassium phosphate monobasic, potassium phosphate dibasic, magnesium phosphate, magnesium sulfate, sodium chloride, ferrous sulfate, manganese sulfate, copper sulfate, and calcium carbonate. Further, an antifoaming agent such as a vegetable oil, a surfactant, or silicon may be added as necessary.

Among the examples mentioned above, the medium is preferably a medium mainly containing a peptone, a fish extract, corn steep liquor, or a yeast extract, more preferably a medium containing a yeast extract. The yeast extract concentration is preferably 0.5 to 10% by weight, more preferably 1 to 5% by weight, based on the medium.

The culture conditions may be appropriately selected according to the type of medium, the culture method, and other factors, and any conditions that allow the cells to proliferate to produce the target protein may be used. The culture is usually carried out in a liquid medium under aerobic conditions such as shaking culture or aeration stirring culture. The shaking speed during shaking culture is preferably 50 to 300 rpm, more preferably 100 to 200 rpm. The culture temperature is preferably 25 to 35° C., more preferably 27 to 30° C. The pH is preferably 3.0 to 9.0, more preferably 6.0 to 8.0.

The culture time is preferably 24 to 96 hours, more preferably 48 to 72 hours. Subculture may also be performed by diluting the culture solution 10 to 250 times. The number of subcultures is preferably 2 to 4 to maintain a high purity of the target protein, but the plasmid can be stably maintained even after 10 subcultures.

The method for producing a target protein preferably includes purifying the target protein after culturing the cells. In the step of purifying the target protein, when the target protein accumulates in the cells, the cells may be collected by centrifugation or filtration, and the collected cells may be crushed by sonication or other means, followed by centrifugation, solid-liquid separation using a filtration aid such as diatomaceous earth or cellulose powder, or other separation techniques to provide a cell-free extract. The target protein can be purified from this cell-free extract as a starting material by a general protein purification method such as salting-out or various chromatographic techniques (e.g., ion exchange chromatography, gel filtration chromatography, hydrophobic chromatography, affinity chromatography). When the target protein is secreted outside the cells, it can be purified similarly from the culture supernatant instead of the cell-free extract.

<Cell>

Any cells in which the target protein can be expressed can be used. Microbial cells, animal cells, and plant cells can all be used. From the standpoint of productivity of the target protein and ease of culture, microbial cells are preferred, and bacteria are more preferred.

Examples of the bacteria include: actinomycetes for which the host-vector systems have been developed, such as the genus *Streptomyces* and the genus *Rhodococcus*; and bacteria for which the host-vector systems have been developed, such as the genus *Escherichia*, the genus *Bacillus*, the genus *Pseudomonas*, the genus *Serratia*, the genus *Brevibacterium*, the genus *Corynebacterium*, the genus *Streptococcus*, and the genus *Lactobacillus*. Other examples include: yeasts for which the host-vector systems have been developed, such as the genus *Saccharomyces*, the genus *Kluyveromyces*, the genus *Schizosaccharomyces*, the genus *Zygosaccharomyces*, the genus *Yarrowia*, the genus *Trichosporon*, the genus *Rhodosporidium*, the genus *Pichia*, and the genus *Candida*; and fungi for which the host-vector systems have been developed, such as the genus *Neurospora*, the genus *Aspergillus*, the genus *Cephalosporium*, and the genus *Trichoderma*. Among these, actinomycetes are preferred, and actinomycetes of the genus *Streptomyces* are more preferred.

Examples of the genus *Streptomyces* include *Streptomyces lividans, Streptomyces violaceoruber, Streptomyces cinnamoneus, Streptomyces avermetilis, Streptomyces thermoviolaceus,* and *Streptomyces halstedii*.

Examples of specific strains of *Streptomyces lividans* include *Streptomyces lividans* 1326. This strain is also known as *Streptomyces violaceoruber* 1326, and its cultures and purified products have been confirmed to be safe when used in food.

Examples of the genus *Escherichia* include *Escherichia coli*.

Examples of the animal cells include cells derived from humans, mice, rats, dogs, monkeys, Chinese hamsters, drosophilae, cabbage moths, cabbage loopers, etc. Examples of the plant cells include cells derived from tobacco, corn, rice, etc.

The above cells may be cells in which the target protein is originally expressed, or may be cells in which the target protein is not originally expressed. Even in the cells in which the target protein is originally expressed, the productivity of the target protein can be improved by transformation with a vector.

<Vector>

The vector may be any vector that allows the target protein to be expressed in the cells. Examples of specific forms include plasmid vectors, phage vectors, and cosmid vectors. From the standpoint of ease of transformation, plasmid vectors are preferred. The total length of the vector, including the gene sequence of the target protein and other sequences described later, is preferably 3,000 to 10,000 bp, preferably 4,500 to 6,500 bp. When the total length exceeds 10,000 bp, such a vector tends to be unstable in the cells. When the total length is shorter than 3,000 bp, the available length of the gene sequence of the target protein is limited.

<Target Protein>

The target protein may be any protein that can be expressed in the cells. Examples include: structural proteins such as enzymes, hormones, receptors, and collagens; transport proteins such as hemoglobin; and contractile proteins such as myosin. Among these, enzymes are preferred because they are easily applicable to food.

Examples of the enzymes include phospholipase, glucanase, protease, α-amylase, β-amylase, maltogenic amylase, glucan 1,4-α-maltotriohydrolase, glucan 1,4-α-maltohexaosidase, cellulase, hemicellulase, galactolipase, glucose oxidase, ascorbate oxidase, peroxidase, lipoxygenase, catalase, glutathione dehydrogenase, peptidase, transglutaminase, cyclodextrin glucanotransferase, triacylglycerol lipase, phosphodiesterase, esterase, muramidase, phosphatase, glutaminase, chitosanase, and chitinase. Preferred among these are phospholipase, glucanase, and protease.

The DNA encoding phospholipase may be any of the following DNAs (a), (b), and (c):
(a) DNA containing the base sequence of SEQ ID NO: 1 in the sequence listing;
(b) DNA that has at least 85% sequence identity to the base sequence of SEQ ID NO: 1 in the sequence listing and encodes a polypeptide having phospholipase activity; and
(c) DNA that contains the base sequence of SEQ ID NO: 1 in the sequence listing, in which one or more bases are deleted, inserted, substituted, and/or added, and encodes a polypeptide having phospholipase activity.

The sequence identity to the base sequence of SEQ ID NO: 1 is preferably at least 90%, more preferably at least 95%, still more preferably at least 98%.

In the base sequence of SEQ ID NO: 1 in the sequence listing, the number of bases to be deleted, inserted, substituted, and/or added is preferably 243 or less, more preferably 162 or less, still more preferably 81 or less, even more preferably 32 or less, particularly preferably 20, 10, 5, 4, 3, or 2 or less.

The DNA encoding glucanase may be any of the following DNAs (a), (b), and (c):
(a) DNA containing the base sequence of SEQ ID NO: 2 in the sequence listing;
(b) DNA that has at least 85% sequence identity to the base sequence of SEQ ID NO: 2 in the sequence listing and encodes a polypeptide having glucanase activity; and
(c) DNA that contains the base sequence of SEQ ID NO: 2 in the sequence listing, in which one or more bases are deleted, inserted, substituted, and/or added, and encodes a polypeptide having glucanase activity.

The sequence identity to the base sequence of SEQ ID NO: 2 is preferably at least 90%, more preferably at least 95%, still more preferably at least 98%.

In the base sequence of SEQ ID NO: 2 in the sequence listing, the number of bases to be deleted, inserted, substituted, and/or added is preferably 179 or less, more preferably 119 or less, still more preferably 59 or less, even more preferably 23 or less, particularly preferably 20, 10, 5, 4, 3, or 2 or less.

Examples of the hormones include growth hormone, follicle-stimulating hormone, insulin, and calcitonin.

<Replication Initiator Sequence>

The vector needs to have a replication initiator sequence in order to be maintained and amplified in the cells. Examples of the replication initiator sequence include a replication initiator sequence derived from the plasmid vector pIJ101, a replication initiator sequence derived from the plasmid vector pSG5, and a replication initiator sequence derived from the plasmid vector SLP2. Preferred among these is a replication initiator sequence derived from pIJ101. The length of the replication initiator sequence is preferably 500 to 2000 bp, more preferably 1000 to 1500 bp.

<Promoter Sequence>

The vector has a promoter sequence in the gene encoding the target protein. The promoter sequence may be a promoter originally possessed by the target protein, or may be a heterologous promoter. When a heterologous promoter is used, examples of genes from which the promoter is derived include a metalloendopeptidase gene, a phospholipase D (PLD) gene, a xylose isomerase gene, a xylanase gene, an amylase gene, and a protease gene. Among these, the promoter sequence is preferably a promoter sequence derived from a metalloendopeptidase gene or a phospholipase D (PLD) gene. The length of the promoter sequence is preferably 50 to 2000 bp, more preferably 60 to 400 bp.

The DNA having a promoter sequence derived from a metalloendopeptidase gene may be any of the following DNAs (a), (b), and (c):
(a) DNA containing the base sequence of SEQ ID NO: 3 in the sequence listing;
(b) DNA that has at least 85% sequence identity to the base sequence of SEQ ID NO: 3 in the sequence listing and induces expression of the target protein in the cells; and
(c) DNA that contains the base sequence of SEQ ID NO: 3 in the sequence listing, in which one or more bases are deleted, inserted, substituted, and/or added, and induces expression of the target protein in the cells.

The sequence identity to the base sequence of SEQ ID NO: 3 is preferably at least 90%, more preferably at least 95%, still more preferably at least 98%.

In the base sequence of SEQ ID NO: 3 in the sequence listing, the number of bases to be deleted, inserted, substituted, and/or added is preferably 44 or less, more preferably 29 or less, still more preferably 14 or less, even more preferably 5 or less, particularly preferably 4, 3, or 2 or less.

The DNA having a promoter sequence derived from a phospholipase D (PLD) gene may be any of the following DNAs (a), (b), and (c):
(a) DNA containing the base sequence of SEQ ID NO: 4 in the sequence listing;
(b) DNA that has at least 85% sequence identity to the base sequence of SEQ ID NO: 4 in the sequence listing and induces expression of the target protein in the cells; and
(c) DNA that contains the base sequence of SEQ ID NO: 4 in the sequence listing, in which one or more bases are deleted, inserted, substituted, and/or added, and induces expression of the target protein in the cells.

The sequence identity to the base sequence of SEQ ID NO: 4 is preferably at least 90%, more preferably at least 95%, still more preferably at least 98%.

In the base sequence of SEQ ID NO: 4 in the sequence listing, the number of bases to be deleted, inserted, substituted, and/or added is preferably 10 or less, more preferably 7 or less, still more preferably 3 or less, even more preferably 1 or less.

<Terminator Sequence>

The vector has in the gene encoding the target protein a terminator sequence for stopping transcription. The terminator sequence may be a terminator originally possessed by the target protein, or may be a heterologous terminator. When a heterologous terminator is used, examples of genes from which the terminator is derived include a phospholipase D (PLD) gene, a metalloendopeptidase gene, and an amylase gene. Among these, the terminator sequence is preferably a terminator sequence derived from a phospholipase D (PLD) gene.

The DNA having a terminator sequence derived from a phospholipase D (PLD) gene may be any of the following DNAs (a), (b), and (c):
  (a) DNA containing the base sequence of SEQ ID NO: 5 in the sequence listing;
  (b) DNA that has at least 85% sequence identity to the base sequence of SEQ ID NO: 5 in the sequence listing and stops transcription of the gene of the target protein in the cells; and
  (c) DNA that contains the base sequence of SEQ ID NO: 5 in the sequence listing, in which one or more bases are deleted, inserted, substituted, and/or added, and stops transcription of the gene of the target protein in the cells.

The sequence identity to the base sequence of SEQ ID NO: 5 is preferably at least 90%, more preferably at least 95%, still more preferably at least 98%.

In the base sequence of SEQ ID NO: 5 in the sequence listing, the number of bases to be deleted, inserted, substituted, and/or added is preferably 30 or less, more preferably 20 or less, still more preferably 10 or less, even more preferably 4 or less, particularly preferably 3 or 2 or less.

<Antibiotic Resistance Gene and the Like>

The vector used in the present invention is characterized by not containing an antibiotic resistance gene, a recombinase recognition sequence, or a gene essential for cell survival.

When an antibiotic resistance gene is used, an antibiotic is added to the culture medium as a selective pressure, which can lead to the generation of resistant bacteria due to the leakage of the antibiotic itself or the antibiotic resistance gene into the environment. Since the vector used in the present invention does not contain an antibiotic resistance gene, such a risk can be eliminated. The antibiotic resistance gene refers to a gene that maintains the activity of degrading an antibiotic or the activity of inhibiting the action of an antibiotic. Examples of the antibiotic referred here include thiostrepton, penicillin, kanamycin, vancomycin, erythromycin, viomycin, neomycin, streptomycin, tetracycline, and chloramphenicol.

In Patent Literatures 1 and 2 and Non-Patent Literatures 1 and 2, a recombinase recognition sequence is used to selectively cut and remove an antibiotic resistance gene out of a vector. Examples of such a recombinase include Cre, Flp, R, XerC, XerD, RipX, and CodV. Moreover, examples of the recombinase recognition sequence include a transposase target site, Ecdif, cer, psi, pif, mwr, Bsdif, loxP, FRT, and RS.

In Patent Literature 3, a gene essential for cell survival is knocked out from host cells and instead introduced into a vector to stably maintain the vector. Examples of such a gene include a gene encoding a ribosome recycling factor, a gene encoding a translation initiation factor, and a gene encoding a toxin-antitoxin system.

<Production of Vector and Transformation of Cells>

The vector used in the present invention can be produced by linking the gene of the target protein, a replication initiator sequence, a promoter sequence, and other sequences by a known method. An exemplary linking method may include cleavage with a restriction enzyme and ligation with a DNA ligase. The DNA cleaved by a restriction enzyme may be plasmid DNA or may be a PCR product.

Any transformation method that can introduce the vector into cells can be employed. Well-known methods such as an electroporation method, a protoplast-PEG method, a calcium chloride method, and a particle gun method can be used. After the transformation, the presence of the vector in the cells can be confirmed by well-known methods such as colony PCR. Moreover, the expression of the target protein by the cells can be confirmed by SDS-PAGE.

EXAMPLES

The present invention will be described below with reference to examples, but the present invention is not limited to the following examples. Hereinafter, "parts" or "%" means "parts by weight" or "% by weight", respectively, unless otherwise noted.

<Example 1> Knocking Out of Drug Resistance Gene by Restriction Enzyme Treatment <Separation of Plasmid DNA>

The glucanase-producing strain *Streptomyces violaceoruber* pGlu was cultured at 28° C. for three days in 5 mL of tryptic soy medium (available from Becton, Dickinson and Company) and then harvested. For extraction of the expression plasmid pGlu, a QIAprep Miniprep kit (available from QIAGEN) was used for preparation. However, lysozyme (available from Sigma-Aldrich) was added to buffer P1 to a final concentration of 2.5 mg/mL, and the cells of the pGlu strain were suspended in the buffer P1 containing lysozyme and left in that state for 30 minutes at 37° C. Then, the expression plasmid pGlu was extracted according to the attached instructions.

<Preparation of Expression Plasmid and Transformation of Host Cells>

The extracted pGlu plasmid was digested with the restriction enzymes PvuII and EcoRV. The resulting fragments were ligated and then introduced into *Streptomyces lividans* 1326 to prepare a transformant.

<Selection of Enzyme-Producing Strains>

Each colony after the transformation was transferred into tryptic soy agar medium (available from Becton, Dickinson and Company) and then cultured at 28° C. for three days. One loopful of cells was dispersed in 10 μL of 0.1 N NaOH aqueous solution and heated at 95° C. for 15 minutes. A PCR reaction was performed using this solution as a template. A sense primer (SEQ ID NO: 6) and an antisense primer (SEQ ID NO: 7) were designed based on the base sequence of the rep pIJ101 gene which was a replication factor of the expression plasmid. The composition of the PCR reaction solution was as follows: 3 μL of GO Taq (available from Bio-Rad Laboratories, Inc.); 0.05 μL of 100 μM sense primer; 0.05 μL of 100 μM antisense primer; and distilled water added such that the total amount was 10 μL. The PCR reaction conditions were as follows: Step 1 at 98° C. for three minutes; Step 2 at 98° C. for 15 seconds; Step 3 at 50° C. for 30 seconds; and Step 4 at 72° C. for one minute. Step 2 to Step 4 were repeated 30 times. This PCR yielded a specific amplification product of about 500 bp in 4 colonies out of 48 colonies.

The transformant from which the amplification product was obtained was transferred into 6 mL of tryptic soy medium (available from Becton, Dickinson and Company) placed in a test tube sterilized in an autoclave at 121° C. for 20 minutes, and then cultured at 28° C. with reciprocal shaking at 300 rpm for three days. After centrifugation (10,000 rpm for 10 minutes at room temperature) of the culture solution (1 mL), the supernatant was discarded, and the cell precipitate was subjected to plasmid extraction as described above.

Figure 1:
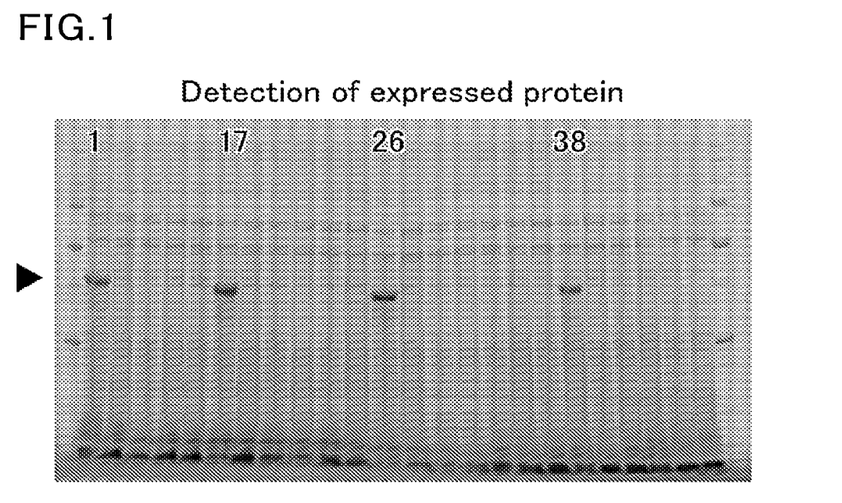
FIG. 1 shows the results of detection of a target protein in Example 1.

Moreover, the culture solution in tryptic soy medium was transferred into 6 mL of enzyme-producing medium and cultured at 28° C. and 300 rpm for three days. The culture solution was centrifuged, and the supernatant was subjected to sodium dodecyl sulfate-polyacrylamide electrophoresis (SDS-PAGE) to confirm enzyme production. In accordance with the SDS-PAGE method, electrophoresis was performed at a fixed voltage of 200 V using a polyacrylamide gel available from Bio-Rad Laboratories, Inc. (trade name: Criterion TGX Stain-Free Any kD precast gel), and electrophoresis images were taken with a gel imaging apparatus (trade name: Gel Doc RZ Imager, Stain-Free system available from Bio-Rad Laboratories, Inc.) (FIG. 1, Table 1).

<Confirmation of Thiostrepton Sensitivity>

Figure 2:
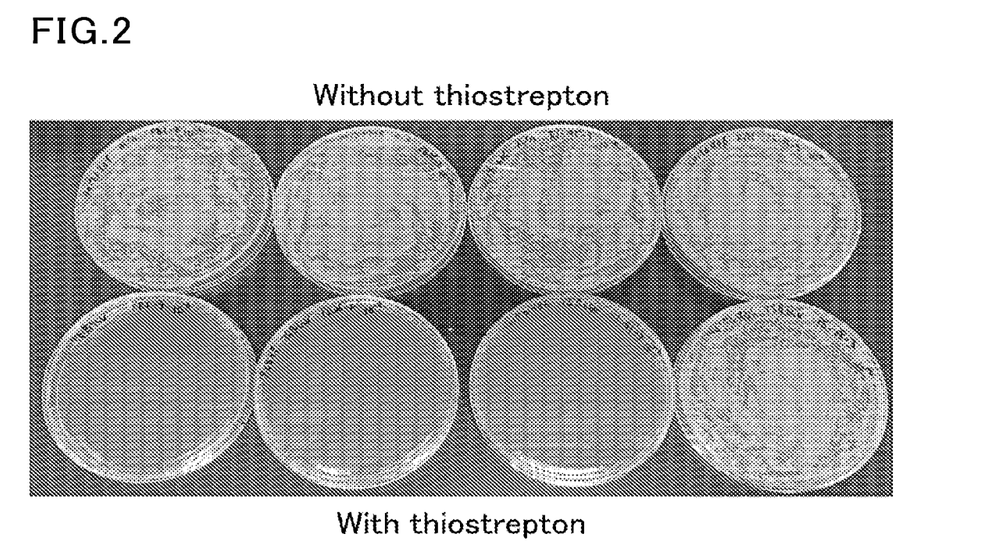
FIG. 2 shows the results of testing of sensitivity to an antibiotic in Example 1.

The selected strains in which enzyme production had been confirmed were applied to tryptic soy agar medium containing thiostrepton (50 ppm) and then cultured at 28° C. for three days (FIG. 2, Table 1).

<Confirmation of Base Sequence of Expression Plasmid of Selected Enzyme-Producing Strain>

The selected strains in which enzyme production and thiostrepton sensitivity had been confirmed were treated in the same manner as described above to prepare plasmid DNA, which was then analyzed with a DNA sequencer to determine the base sequence. Table 1 shows the results.

TABLE 1

| Strain | No. 1 | No. 17 | No. 26 | No. 38 |
|---|---|---|---|---|
| Protein production | + | + | + | + |
| Drug resistance | − | − | − | + |
| Eco RV-Pvu II Cleavage size | 744 bp | 744 bp | 243 bp | − |
| Pvu II Cleavage sequence | CAC\|CTG | CAC\|CTG | CAG\|CTG | − |

Colony Nos. 1, 17, and 26 had the tsr gene partly knocked out due to the restriction enzymes and indeed showed no drug resistance. Colony No. 38 maintained the tsr gene and was drug-resistant.

<Example 2> Knocking Out of Drug Resistance Gene by PCR

The following PCR reaction was performed using as a template plasmid DNA extracted from the glucanase-producing strain *Streptomyces violaceoruber* pGlu.

A sense primer (SEQ ID NO: 8) to which an EcoRV site was added and an antisense primer (SEQ ID NO: 9) to which an EcoRV site was added were designed. The composition of the PCR reaction solution was as follows: 5 μL of 10×PCR buffer for KOD-plus (available from Toyobo Co., Ltd.); 300 nM each of primers; 0.2 mM each of mixed dNTPs; 1 mM MgSO$_4$; 5% DMSO; 1.0 units of KOD-plus-DNA polymerase; and distilled water added such that the total amount was 50 μL. The PCR reaction conditions were as follows: Step 1 at 98° C. for two minutes; Step 2 at 98° C. for 15 seconds; Step 3 at 60° C. for 30 seconds; and Step 4 at 68° C. for five minutes. Step 2 to Step 4 were repeated 30 times. This PCR yielded a specific amplification product of about 5 Kbp. This amplified fragment was digested with EcoRV, ligated, and then introduced into *Streptomyces lividans* 1326 to prepare a transformant.

Figure 3:
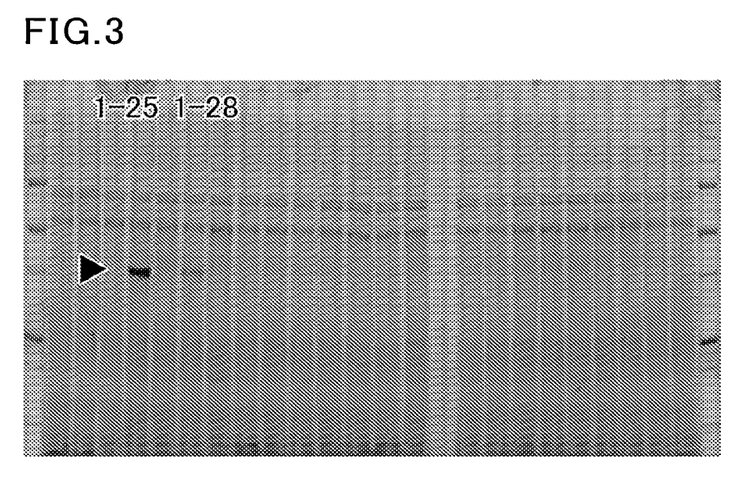
FIG. 3 shows the results of detection of a target protein in Example 2.
Figure 4:
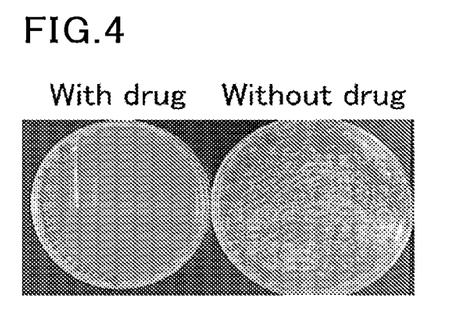
FIG. 4 shows the results of testing of sensitivity to an antibiotic in Example 2.

As in Example 1, the transformant was subjected to detection of plasmid DNA by the colony PCR method, detection of protein production by SDS-PAGE, and confirmation of thiostrepton sensitivity in an agar medium to select enzyme-producing strains. The plasmid DNA of the selected enzyme-producing strains was analyzed with a DNA sequencer to determine the base sequence. The results showed that the transformant expressed glucanase (FIG. 3) and was thiostrepton-sensitive (FIG. 4).

<Evaluation of Plasmid Retention Capacity of Enzyme-Producing Strain>

The transformant was transferred into 50 mL of tryptic soy medium (available from Becton, Dickinson and Company) in a 500 mL baffled flask and then shake-cultured at 28° C. and 160 rpm for three days. An amount of 0.5 mL of this culture solution was again transferred into a flask containing 50 mL of tryptic soy medium and then cultured in the same way. This operation was repeated 10 times. An amount of 0.1 mL of each culture solution was applied to tryptic soy agar medium (available from Becton, Dickinson and Company) and then cultured at 28° C. for three days. Twenty-four colonies were randomly selected from the appearing colonies and subjected to the above-described colony PCR method. The plasmid retention rate was calculated from the number of amplifications observed. Table 2 shows the results.

TABLE 2

| Number of cultures | Plasmid retention rate |
|---|---|
| 3LAF culture (1st) | 71% (17/24) |
| BF culture (2nd) | 83% (20/24) |
| BF culture (3rd) | 96% (23/24) |
| BF culture (4th) | 96% (23/24) |
| BF culture (5th) | 96% (23/24) |
| BF culture (6th) | 88% (21/24) |
| BF culture (7th) | 88% (21/24) |
| BF culture (8th) | 88% (21/24) |
| BF culture (9th) | 71% (17/24) |
| BF culture (10th) | 96% (23/24) |

The transformant had an extremely high plasmid retention rate of 96% even after 10 times of culture at 28° C. for three days. Moreover, the plasmid retention rate was maintained at 70% or higher throughout 10 times of culture.

<Example 3> Knocking Out of Drug Resistance Gene by PCR and Restriction Enzyme Treatment <Preparation of Vector not Containing Thiostrepton Resistance Gene>

A vector not containing a thiostrepton resistance gene was prepared by ligating a PCR fragment obtained using the actinomycete plasmid pIJ702 as a template with a PCR fragment obtained using the *E. coli* plasmid pBluescript II KS+ as a template as described below.

A sense primer (SEQ ID NO: 10) to which an EcoRV site was added and an antisense primer (SEQ ID NO: 11) to which an EcoRV site was added were designed using the actinomycete plasmid pIJ702 as a template. The composition of the PCR reaction solution was as follows: 5 μL of 10×PCR buffer for KOD-plus (available from Toyobo Co., Ltd.); 300 nM each of primers; 0.2 mM each of mixed dNTPs; 1 mM MgSO$_4$; 5% DMSO; 1.0 units of KOD-plus-DNA polymerase; and distilled water added such that the total amount was 50 μL. The PCR reaction conditions were as follows: Step 1 at 98° C. for two minutes; Step 2 at 98° C. for 15 seconds; Step 3 at 60° C. for 30 seconds; and Step 4 at 68° C. for three minutes. Step 2 to Step 4 were repeated 30 times. This PCR yielded a specific amplification product of about 3 kbp. This amplified fragment was digested with EcoRV.

A sense primer (SEQ ID NO: 12) to which an EcoRV site was added and an antisense primer (SEQ ID NO: 13) to which an EcoRV site was added were designed using the *E. coli* plasmid pBluescript II KS+ as a template. The composition of the PCR reaction solution was as follows: 5 μL of 10×PCR buffer for KOD-plus (available from Toyobo Co., Ltd.); 300 nM each of primers; 0.2 mM each of mixed dNTPs; 1 mM $MgSO_4$; 5% DMSO; 1.0 units of KOD-plus-DNA polymerase; and distilled water added such that the total amount was 50 μL. The PCR reaction conditions were as follows: Step 1 at 98° C. for two minutes; Step 2 at 98° C. for 15 seconds; Step 3 at 60° C. for 30 seconds; and Step 4 at 68° C. for three and a half minutes. Step 2 to Step 4 were repeated 30 times. This PCR yielded a specific amplification product of about 3.3 kbp. This amplified fragment was digested with EcoRV. Both fragments were ligated and introduced into *E. coli* JM109 to prepare a transformant. The plasmid contained in this transformant is taken as pIJ350RM. The pIJ350RM plasmid is a shuttle vector for actinomycetes and *E. coli*.

<Method for Preparing Actinomycete Enzyme-Producing Strain>

The following PCR reaction was performed using plasmid DNA extracted from the phospholipase D-producing strain *Streptomyces violaceoruber* pPDN as a template.

A sense primer (SEQ ID NO: 14) to which a KpnI site was added and an antisense primer (SEQ ID NO: 15) to which a ClaI site was added were designed. The composition of the PCR reaction solution was as follows: 5 μL of 10×PCR buffer for KOD-plus (available from Toyobo Co., Ltd.); 300 nM each of primers; 0.2 mM each of mixed dNTPs; 1 mM $MgSO_4$; 5% DMSO; 1.0 units of KOD-plus-DNA polymerase; and distilled water added such that the total amount was 50 μL. The PCR reaction conditions were as follows: Step 1 at 98° C. for two minutes; Step 2 at 98° C. for 15 seconds; Step 3 at 60° C. for 30 seconds; and Step 4 at 68° C. for two minutes. Step 2 to Step 4 were repeated 30 times. This PCR yielded a specific amplification product of about 5 kbp. This amplified fragment was digested with KpnI and ClaI. On the other hand, the newly prepared vector pIJ350RM was digested with KpnI and ClaI. Both fragments were ligated and then introduced into *E. coli* JM109 to prepare a transformant. The plasmid contained in this transformant is taken as pIJ350RM-PDN.

Figure 5:
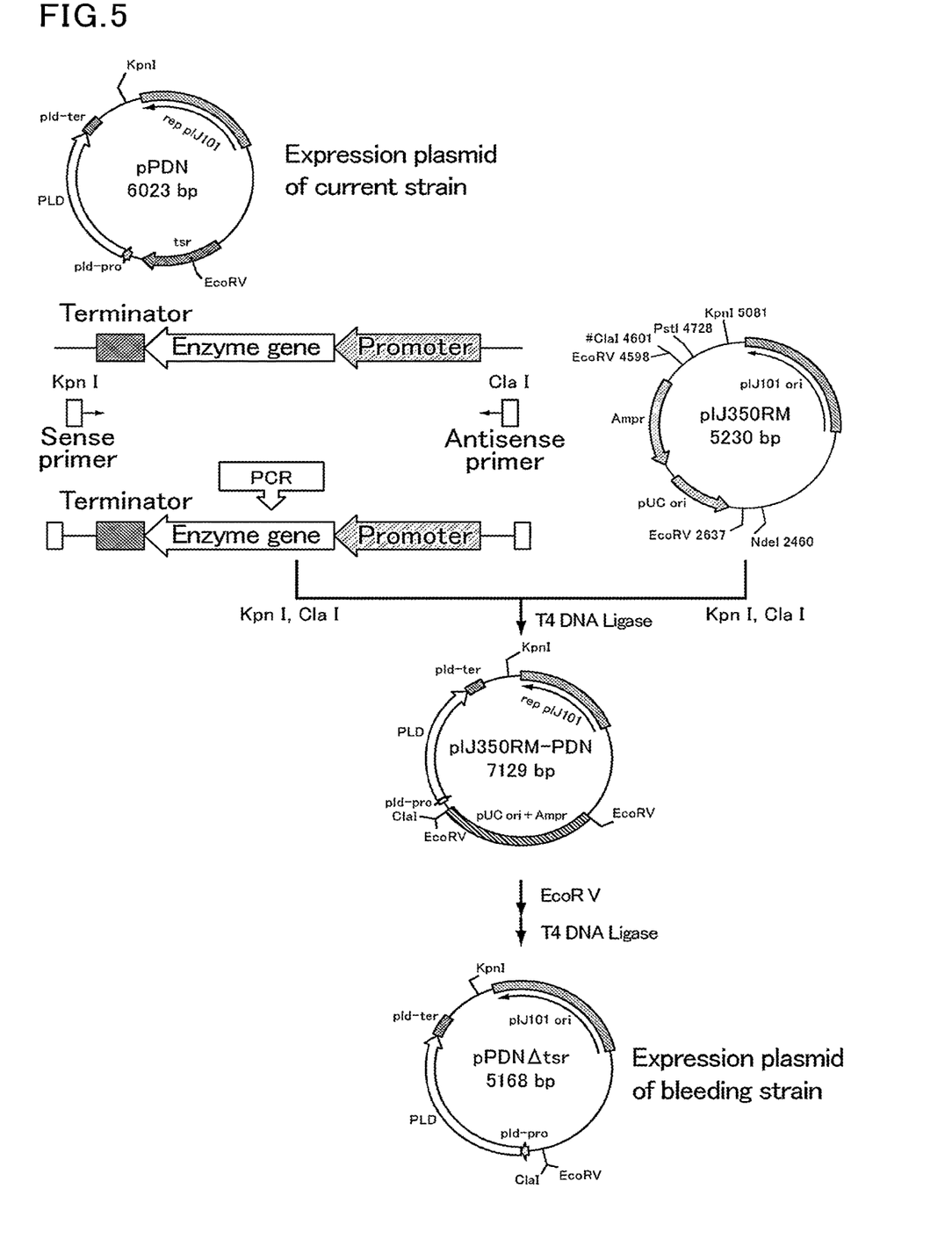
FIG. 5 shows an outline of the method for preparing a vector in Example 3.

The plasmid DNA (pIJ350RM-PDN) extracted from the transformant of *E. coli* JM109 was digested with EcoRV, ligated, and then introduced into *Streptomyces lividans* 1326 to prepare a transformant. The plasmid contained in this transformant is taken as pPDNΔtsr (FIG. 5).

<Selection of Enzyme-Producing Strain>

Figure 6:
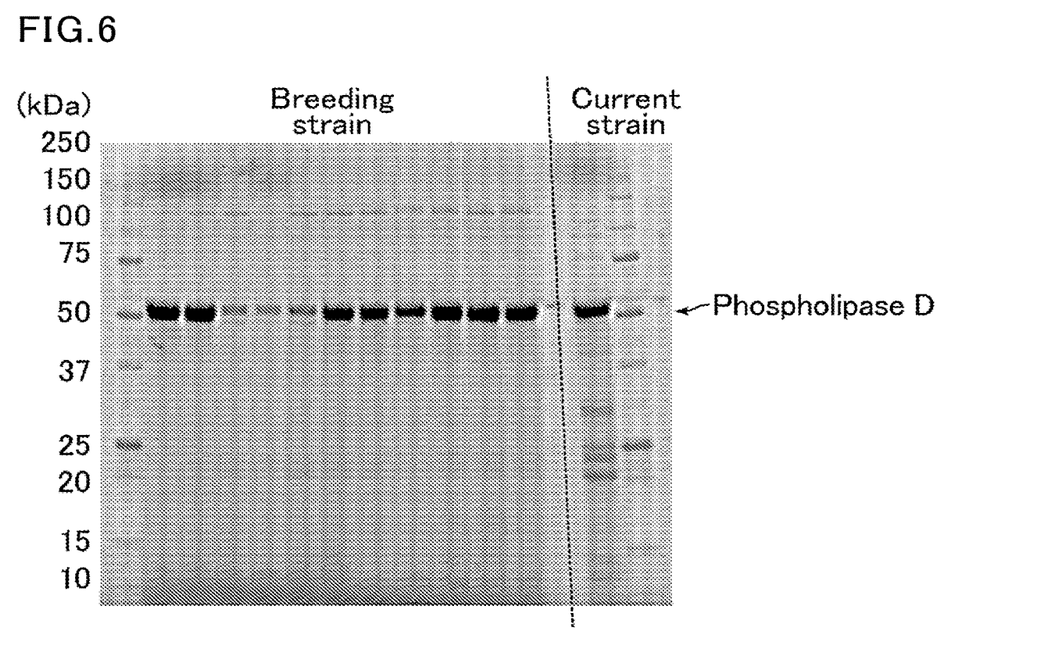
FIG. 6 shows the results of detection of a target protein in Example 3.

Enzyme-producing strains were selected by the same operation as in Examples 1 and 2. The selected strains were treated in the same manner as described above to prepare plasmid DNA, which was then analyzed with a DNA sequencer to determine the base sequence. Moreover, FIG. 6 shows the results of confirmation of protein production by SDS-PAGE. For the breeding strains, a band of phospholipase D at the position of 50 kDa was observed (FIG. 6).

The invention claimed is:

1. A method for producing a target protein, comprising culturing cells transformed with a vector,
wherein the vector comprises a gene of the target protein and does not comprise an antibiotic resistance gene, a recombinase recognition sequence, nor a gene essential for cell survival,
wherein the target protein is phospholipase, glucanase, or protease, and
wherein the vector further comprises a replication initiator sequence obtained from pIJ702 or pIJ350.

2. The production method according to claim 1, wherein the gene essential for cell survival is a gene encoding a ribosome recycling factor or a gene encoding a translation initiation factor.

3. The production method according to claim 1, wherein the cells is cells of a bacterium.

4. The production method according to claim 3, wherein the bacterium is an actinomycete.

5. The production method according to claim 1, wherein the target protein is phospholipase or glucanase.

* * * * *